(12) United States Patent
Cartmell et al.

(10) Patent No.: US 12,474,952 B2
(45) Date of Patent: Nov. 18, 2025

(54) TRAFFIC MANAGEMENT ON AN INTERNAL FABRIC OF A STORAGE SYSTEM

(71) Applicant: Dell Products L.P., Hopkinton, MA (US)

(72) Inventors: Jerome J. Cartmell, Millis, MA (US); James Read, Marlborough, MA (US)

(73) Assignee: Dell Products L.P., Hopkinton, MA (US)

( * ) Notice: Subject to any disclaimer, the term of this patent is extended or adjusted under 35 U.S.C. 154(b) by 759 days.

(21) Appl. No.: 17/479,268

(22) Filed: Sep. 20, 2021

(65) Prior Publication Data

US 2023/0085856 A1   Mar. 23, 2023

(51) Int. Cl.
*G06F 9/48*   (2006.01)
*G06F 16/28*   (2019.01)

(52) U.S. Cl.
CPC .......... *G06F 9/4881* (2013.01); *G06F 16/285* (2019.01)

(58) Field of Classification Search
CPC .............................. G06F 9/4881; G06F 16/285
See application file for complete search history.

(56) References Cited

U.S. PATENT DOCUMENTS

| | | | |
|---|---|---|---|
| 7,281,086 B1 * | 10/2007 | More | G06F 3/0676 710/39 |
| 10,671,302 B1 * | 6/2020 | Aggarwal | G06F 3/067 |
| 2015/0363229 A1 * | 12/2015 | Wang | G06F 9/4881 718/103 |
| 2016/0291882 A1 * | 10/2016 | Wakhare | G06F 3/0613 |
| 2017/0212790 A1 * | 7/2017 | Marmignon | G06F 9/4881 |
| 2017/0289024 A1 * | 10/2017 | Bernat | H04L 45/302 |
| 2021/0240529 A1 * | 8/2021 | Jain | G06F 9/4887 |

* cited by examiner

*Primary Examiner* — Lewis A Bullock, Jr.
*Assistant Examiner* — Carlos Alberto Espana
(74) *Attorney, Agent, or Firm* — BainwoodHuang (57) ABSTRACT

For each source process running on a source node, a rate of high-priority operations initiated by the first process during the period that require accessing a target node can be calculated. An average rate (e.g., an exponential moving average (EMA)) of high-priority operations initiated by the first process over a larger period of time that require accessing the target node can be calculated. Similarly, a rate of high-priority operations initiated by any process executing on a processing node during the period that require accessing the target node can be calculated, and an average rate (e.g., an EMA) of high-priority operations initiated by any such process over the larger period of time that require accessing the target node can be calculated. If one or more of the rates for the period or the average rates reach or exceed respective thresholds, corrective actions can be taken.

12 Claims, 5 Drawing Sheets

TRAFFIC MANAGEMENT ON AN INTERNAL FABRIC OF A STORAGE SYSTEM

BACKGROUND

Data storage systems (often referred to herein simply as "storage systems") include storage resources used by one or more host systems (sometimes referred to herein as "hosts"), i.e., servers, to store data. One or more storage systems and one or more host systems are typically interconnected by one or more network components, for example, as part of a switching fabric, to form a data storage network (often referred to herein simply as "storage network"). Storage systems can provide a variety of data services to host systems of the storage network.

A host system can have host applications that utilize the data services provided by one or more storage systems of the storage network to store data on the physical storage devices (e.g., tape, disks or solid state devices) thereof. For a given application, to perform input/output (I/O) operations utilizing a physical storage device of the storage system, one or more components of the host system, storage system and network components therebetween are used. The one or more combinations of components of the host, switching fabric and storage system over which I/O operations between an application and the storage system are communicated can be considered an I/O path between the application and the storage system. It should be appreciated that other combinations of components of a storage network, for example, two or more storage systems, also can be coupled together by one or more switches of a switching fabric. Thus, more generically, the one or more combinations of components of a first network component, switching fabric and second network component over which I/O communications are communicated can be considered an I/O path between the two network components. The collective I/O paths between components of a storage network can be considered to define a connectivity of the storage network.

Host systems do not typically address the physical storage devices of a storage systems directly, but rather access to data stored on such physical storage devices can be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY

In an embodiment of the subject matter disclosed, a method includes: for a first process executing on a first storage processing node of a data storage system, determining that a first operation to be executed requires accessing a second processing node of the data storage system over an internal fabric of the storage system; determining that the first operation is of a first category of operation; updating an average rate at which the first process initiates first category operations that require accessing the second processing node over the internal fabric; determining whether the updated average rate exceeds an individual average rate threshold for individual processes; and, if it is determined that the updated average rate exceeds the individual average rate threshold, taking a corrective action for the first process. The method further can include calculating a first rate of first category operations initiated by the first process during a first period of time that require accessing the second processing node over the internal fabric, where the first rate can be used to update the average rate. The method further can include, in response to determining that the first operation to be executed requires accessing the second processing node of the data storage system over the internal fabric and is of the first category, incrementing a first counter that counts first category operations initiated by the first process during a current period that require accessing the second processing node over the internal fabric. The method further can include: determining whether the first rate exceeds an individual rate threshold for individual processes; and, if it is determined that the first rate exceeds the individual rate threshold, taking a corrective action for the first process. A plurality of processes, including the first process, can be executing on the first storage processing node, and the method further can include: updating a cumulative average rate at which the plurality of processes cumulatively initiate first category operations that require accessing the second processing node over the internal fabric; determining whether the updated cumulative average rate exceeds a cumulative average rate threshold for the plurality of processes; and, if it is determined that the updated cumulative average rate exceeds the cumulative average rate threshold, taking a corrective action corresponding to one or more of the plurality of processes. The method further can include calculating a present cumulative rate of first category operations initiated by the plurality of processes during the first period that require accessing the second processing node over the internal fabric, and the present cumulative rate can be used to update the cumulative average rate. The method further can include: determining whether the present cumulative rate exceeds a cumulative rate threshold for the plurality of processes; and, if it is determined that the present cumulative rate exceeds the cumulative rate threshold, taking a corrective action corresponding to one or more of the plurality of processes. The average rate can be an exponential moving average. The first category of operation can be high priority, and execution of high-priority operations can take precedence over execution of non-high-priority operations. Execution of the first operation can include accessing memory on the second processing node. Accessing the second processing node over the internal fabric can include configuring one or more communications over the internal fabric according to an InfiniBand protocol. Updating the average rate can be performed by a process other than the first process executing on the first processing node.

In another embodiment, a system includes executable logic that implements the method described above. The method includes: for a first process executing on a first storage processing node of a data storage system, determining that a first operation to be executed requires accessing a second processing node of the data storage system over an internal fabric of the storage system; determining that the first operation is of a first category of operation; updating an average rate at which the first process initiates first category operations that require accessing the second processing node over the internal fabric; determining whether the updated average rate exceeds an individual average rate threshold for individual processes; and, if it is determined that the updated average rate exceeds the individual average rate threshold, taking a corrective action for the first process. The method further can include calculating a first rate of first category operations initiated by the first process during a first period of time that require accessing the second processing node over the internal fabric, and the first rate can be used to update the average rate. The method further can include, in response to determining that the first operation to be executed requires accessing the second processing node of the data storage system over the internal fabric and is of the first category, incrementing a first counter that counts first category operations initiated by the first process during a current period that require accessing the second processing node over the internal fabrice. A plurality of processes, including the first process, can be executing on the first storage processing node, and the method further can include: updating a cumulative average rate at which the plurality of processes cumulatively initiate first category operations that require accessing the second processing node over the internal fabric; determining whether the updated cumulative average rate exceeds a cumulative average rate threshold for the plurality of processes; and, if it is determined that the updated cumulative average rate exceeds the cumulative average rate threshold, taking a corrective action corresponding to one or more of the plurality of processes.

In another embodiment, one or more computer-readable media have software stored thereon defining the above described method. The software includes: executable code that controls, for a first process executing on a first storage processing node of a data storage system, determining that a first operation to be executed requires accessing a second processing node of the data storage system over an internal fabric of the storage system; executable code that controls determining that the first operation is of a first category of operation; executable code that controls updating an average rate at which the first process initiates first category operations that require accessing the second processing node over the internal fabric; executable code that controls determining whether the updated average rate exceeds an individual average rate threshold for individual processes; and executable code that controls taking a corrective action for the first process if it is determined that the updated average rate exceeds the individual average rate threshold. The software further includes executable code that controls calculating a first rate of first category operations initiated by the first process during a first period of time that require accessing the second processing node over the internal fabric, and the first rate can be used to update the average rate. The software further includes executable code that controls, in response to determining that the first operation to be executed requires accessing the second processing node of the data storage system over the internal fabric and is of the first category, incrementing a first counter that counts first category operations initiated by the first process during a current period that require accessing the second processing node over the internal fabric. A plurality of processes, including the first process, can be executing on the first storage processing node, and the software can further include: executable code that controls updating a cumulative average rate at which the plurality of processes cumulatively initiate first category operations that require accessing the second processing node over the internal fabric; executable code that controls determining whether the updated cumulative average rate exceeds a cumulative average rate threshold for the plurality of processes; and executable code that controls taking a corrective action corresponding to one or more of the plurality of processes if it is determined that the updated cumulative average rate exceeds the cumulative average rate threshold.

In at least one embodiment, the corrective action or measure taken can include not allowing high-priority operations to take precedence over other non-high-priority operations. The corrective action can be enforced or implemented for a specified amount of time.

In at least one embodiment, the corrective action or measure taken can include only allowing a high-priority operation to take precedence over a specified number of other non-high-priority operations awaiting servicing in a queue. In this manner, the specified number of other non-high-priority operations can be allowed to proceed for servicing prior to the high priority operation.

BRIEF DESCRIPTION OF THE DRAWINGS

Features and advantages of the present disclosure will become more apparent from the following detailed description of illustrative embodiments thereof taken in conjunction with the accompanying drawings in which.

DETAILED DESCRIPTION

As described in more detail elsewhere herein, a storage system can include multiple, physically discrete storage processing nodes (e.g., circuit boards), which are referred to herein as "processing nodes," and an internal fabric over which the processing nodes communicate. Each processing node can include: one or more logical processing components referred to as "directors;" a memory portion; one or more processing cores including compute resources, for example, as part of a CPU and/or a CPU complex for processing I/O operations; and a fabric interface module (FIM) for interfacing the processing node to the internal fabric. In some embodiments, each of the directors on a processing node, or a portion thereof, are implemented in software stored in a memory portion of the processing node (e.g., in a dedicated local memory), and the software is executed by one or more of the processing cores of the processing node. Each FIM of a processing node can include one or more host channel adapters (HCAs) that physically couple, and are configured to enable communication between, the processing node and the internal fabric.

On storage systems including multiple processing nodes, the processing nodes can communicate with each other to perform certain operations. For example, consider a first processing node that needs to access data stored in memory on another processing node and/or to store data in memory on another processing node. To access another processing node, a processing node can exchange one or more communications over the internal fabric that connects the two processing nodes. The processing nodes can be configured to exchange communications over the internal fabric in accordance with one or more protocols, for example, an InfiniBand protocol (TB). In such embodiments, each communication can require being configured (e.g., encapsulated) in accordance with IB. If many processing nodes (source nodes) are attempting to access resources (e.g., memory) on a same processing node (target node), e.g., using a same HCA of the target node, congestion can develop on the target node, causing delays in the execution of operations. Congestion caused by multiple source nodes attempting to access resources on a same processing node is sometimes referred to as "fan-in congestion." For example, communications can be queued on the target node. If the source nodes are trying to access a same memory location, the memory location can be locked in turn by each operation until it is complete, and the other source nodes can continue to poll the target node for access to the memory location until it is freed, causing further congestion.

Some storage systems are configured to enable processing nodes to ascribe priority to certain operations (i.e., tasks) performed, such that source and target nodes will give precedence to higher priority operations. For example, the operating system (OS) of the processing node can be configured to assign higher priority to certain operations. If fan-in congestion is present, giving higher priority to certain operations can exacerbate execution delays for operations that are not of higher priority; i.e., lower-priority operations. If the execution delays are extreme enough, operations can time out on the HCAs of the source system; i.e., the length of time a source HCA (i.e., the HCA of the source node) waits for a response from a target HCA (i.e., the HCA of the target node) can reach a predefined threshold of time at which the request times out. The timing-out of lower-priority operations as a result of fan-in is sometimes referred to as "starvation." On some storage systems, HCAs and/or other processing node components are not configured with anti-starvation logic to prevent starvation of lower-priority operations.

For storage systems with a relatively low number of processing nodes and/or a relatively low number of processing cores per processing node, starvation of low-priority operations can occur rarely or not at all. However, as the number of processing nodes on a storage system increases, and the number of processing cores on each storage node increases (e.g., as a result of technology advances), so does the amount of parallel processing on the storage system, which increases the likelihood of starvation of lower-priority operations, e.g., in the absence of anti-starvation logic.

What is desired is a way to reduce the likelihood of the occurrence of starvation of lower-priority operations on storage systems having multiple processing nodes.

Described herein are techniques and mechanisms for reducing the likelihood of the occurrence of starvation of lower-priority operations on storage systems having multiple processing nodes. The techniques and mechanisms described herein can also improve performance of lower-priority operations on storage systems having multiple processing nodes.

In some embodiments, one or more processes on a processing node that are initiating a sustained high rate of high-priority operations over an extended period of time that require accessing resources on a same target node are identified, and corrective actions taken. In some embodiments, this identification can be made without the need to store a lot of historical data or make computational expensive calculations.

For example, for each process (source process) running on a processing node (source node), a count can be maintained, for each other processing node (target node) on the storage system, of the number of operations initiated by the source process during a period of time that are high-priority operations and require accessing resources (e.g., memory) on the target node. For each source process, for each target node, a rate of high-priority operations initiated by the first process during the period that require accessing the target node can be calculated using the count for the period. Further, an average rate of high-priority operations initiated by the first process over a larger period of time (e.g., since the process was initiated) that require accessing the target node can be calculated. If either the rate for the period or the average rate reach or exceed respective thresholds, one or more corrective actions can be taken.

In some embodiments, for each source node, for each target node, a rate of high-priority operations initiated by the plurality of processes on the source node during a period that requires accessing the target node is calculated. Further, for each target node, an average rate of high-priority operations initiated by the plurality of processes on the source node over the larger period of time that require accessing the target node can be calculated. If either such rate for the period or such average rate reach or exceed respective thresholds, corrective actions can be taken.

In some embodiments, the average rates determined herein are moving averages, for example, exponential moving averages (EMAs). By using an EMA, the averages can be calculated without having to store much historical data or make computational expensive calculations. For example, an EMA can provide a smoothed average value obtained by taking the weighted average of: a rate determined for a present period (for a single process or multiple processes); and a smoothed average value previously determined (e.g., for an immediately preceding period).

In at least one embodiment, only the average thresholds can be used to avoid prematurely taking corrective action for a short-lived spike in high-priority operations that require accessing resources on a target node. Further, if an EMA is used, the smoothing factor can allow (depending on the predefined value of smoothing coefficient) for a slower, smoother transition to a higher average rate as a result of recent increases in count values than if an unweighted average were used. Similarly, if enough recent count values have been high enough to cause a correcting action to be taken, then using only averages, and in particular EMAs, can avoid prematurely undoing corrective action for a short-lived reduction in high-priority operations that require accessing resources on a target node.

In some embodiments, the calculations of the rates for each period and the average rates can be calculated by a process other than any of the processes initiating the operations, e.g., a process dedicated to making such calculations, which can avoid negatively impacting performance of the processes that execute the operations.

While embodiments of the disclosed subject matter are described in relation to high-priority and lower-priority operations, it should be appreciated that the disclosed subject matter is not so limited, as embodiments can include other types of categorization of operations, which are intended to fall within the scope of the present disclosure.

Illustrative embodiments of the disclosed subject matter will now be described in more detail in relation to the figures.

Figure 1:
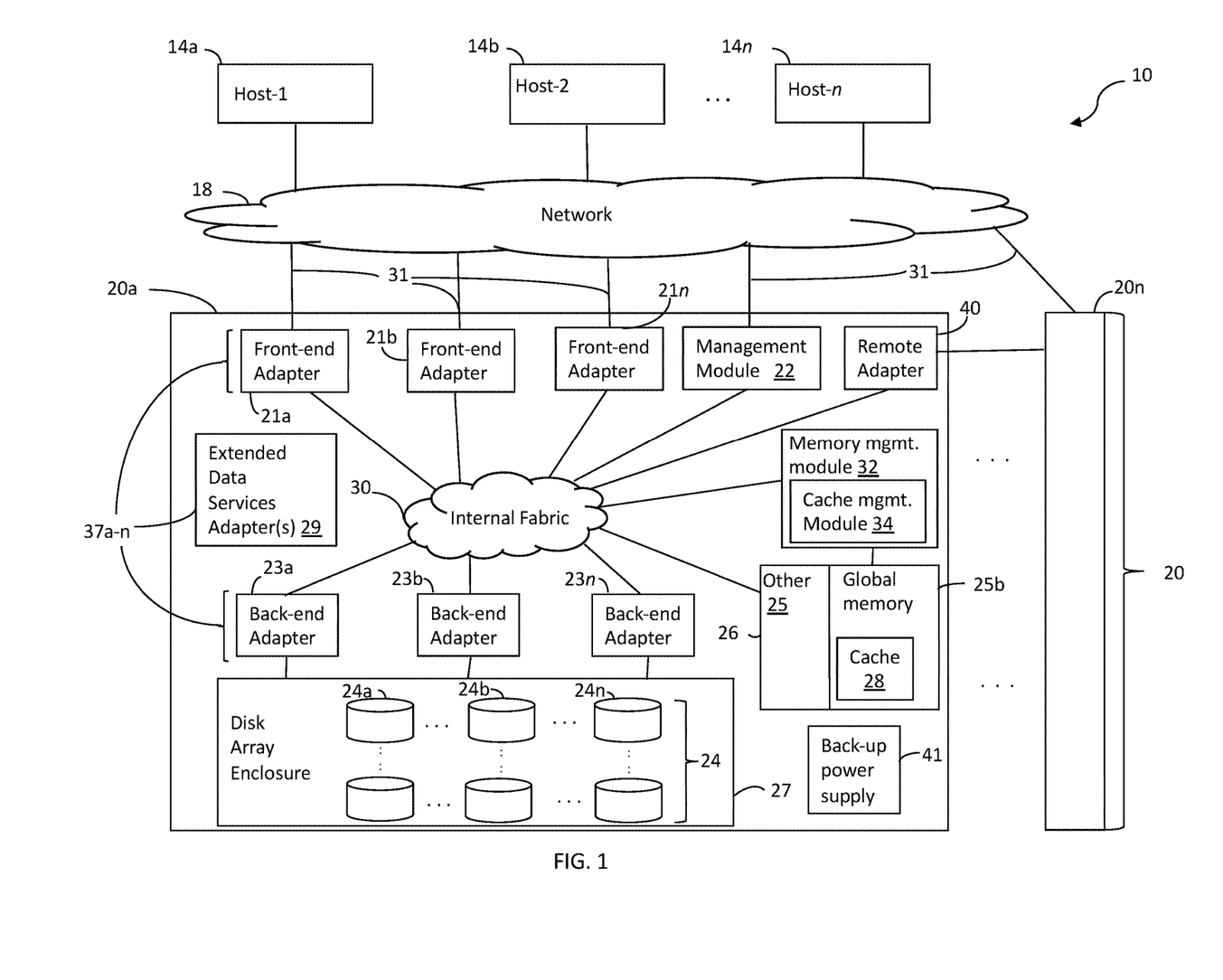
FIG. 1 is a block diagram illustrating a data storage network, according to embodiments of the present disclosure.

FIG. 1 illustrates an example of an embodiment of a data storage network 10 (often referred to herein as a "storage network"). The storage network 10 can include any of: host systems (i.e., "hosts") 14a-n; network 18; one or more storage systems 20*a*-*n*; other components; or any suitable combination of the foregoing. In at least one embodiment, the storage systems 20*a*-*n*, connected to host systems 14*a*-*n* through network 18, can collectively constitute a distributed storage system 20. All of the host computers 14*a*-*n* and storage systems 20*a*-*n* can be located at the same physical site, or, alternatively, two or more host computers 14*a*-*n* and/or storage systems 20*a*-*n* can be located at different physical locations. Storage network 10 or portions thereof (e.g., one or more storage systems 20*a*-*n* in combination with network 18) can be any of a variety of types of storage networks, such as, for example, a storage area network (SAN), e.g., of a data center. Embodiments of the disclosed subject matter are described herein in reference to storage system 20*a*, but it should be appreciated that such embodiments can be implemented using other discrete storage systems (e.g., storage system 20*n*), alone or in combination with storage system 20*a*.

The N hosts 14*a*-*n* access the storage system 20*a*, for example, in performing input/output (I/O) operations or data requests, through network 18. For example, each of hosts 14*a*-*n* can include one or more host bus adapters (HBAs) (not shown) that each include one or more host ports for connecting to network 18. The network 18 includes any one or more of a variety of communication media, switches and other components known to those skilled in the art, including, for example: a repeater, a multiplexer or even a satellite. Each communication medium can be any of a variety of communication media including, but not limited to: a bus, an optical fiber, a wire and/or other type of data link, known in the art. The network 18 can include at least a portion of the Internet, or a proprietary intranet, and components of the network 18 or components connected thereto can be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which can have one or more associated standard specifications. In some embodiments, the network 18 can be, or include, a switching fabric including one or more switches and other components. A network located externally to a storage system that connects host systems to storage system resources of the storage system, can be referred to herein as an "external network."

Each of the host systems 14*a*-*n* and the storage systems 20*a*-*n* included in the storage network 10 can be connected to the network 18 by any one of a variety of connections as provided and supported in accordance with the type of network 18. The processors included in the host computer systems 14*a*-*n* can be any one of a variety of proprietary or commercially available single or multi-processor system, such as an Intel-based processor, or other type of commercially available processor able to support traffic in accordance with each particular embodiment and application. Each of the host computer systems ca perform different types of I/O operations in accordance with different tasks and applications executing on the hosts. In the embodiment of FIG. 1, any one of the host computers 14*a*-*n* can issue an I/O request to the storage system 20*a* to perform an I/O operation. For example, an application executing on one of the host computers 14*a*-*n* can perform a read or write operation resulting in one or more I/O requests being transmitted to the storage system 20*a*.

Each of the storage systems 20*a*-*n* can be manufactured by the same vendor or alternatively different vendors and inter-connected (not shown). Additionally, the storage systems 20*a*-*n* also can be connected to the host systems through any one or more communication connections 31 that can vary with each particular embodiment and device in accordance with the different protocols used in a particular embodiment. The type of communication connection used can vary with certain system parameters and requirements, such as those related to bandwidth and throughput required in accordance with a rate of I/O requests as issued by each of the host computer systems 14*a*-*n*, for example, to the storage systems 20*a*-20*n*. It should be appreciated that the particulars of the hardware and software included in each of the components that can be included in the storage systems 20*a*-*n* are described herein in more detail, and can vary with each particular embodiment.

Each of the storage systems, such as 20*a*, include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and can be enclosed within a disk array enclosure (DAE) 27. In some embodiments, two or more of the physical storage devices 24 are grouped or arranged together, for example, in an arrangement consisting of N rows of physical storage devices 24*a*-*n*. In some embodiments, one or more physical storage devices (e.g., one of the rows 24*a*-*n* of physical storage devices) are connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs can be configured to manage other types of physical storage devices (e.g., SSDs). In the system 20*a*, a single BE, such as 23*a*, can be responsible for the management of one or more (e.g., a row) of physical storage devices, such as row 24*a*. That is, in some configurations, all I/O communications with one or more physical storage devices 24 are be controlled by a specific BE. BEs 23*a*-*n* can employ one or more technologies in communicating with, and transferring data to/from, physical storage devices 24, for example, SAS, SATA or NVMe. For NVMe, to enable communication between each BE and the physical storage devices that it controls, the storage system can include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name suggests, but can be constructed and arranged to enclose a plurality of any type of physical storage device, including any of those described herein, or combinations thereof.

The system 20*a* also can include one or more front-end adapters ("FAs") 21*a*-*n* (e.g., directors configured to serve as FAs), which also are sometimes referred to herein as host adapters ("HAs"). Each of these FAs are used to manage communications and data operations between one or more host systems and global memory (GM) 25*b* of memory 26. The FA can be, or include, a Fibre Channel (FC) adapter if FC is a technology being used to communicate between the storage system 20*a* and the one or more host systems 14*a*-*n*, or can be another type of adapter based on the one or more technologies being used for I/O communications.

Also shown in the storage system 20*a* is a remote adapter ("RA") 40. The RA can be, or include, hardware that includes a processor used to facilitate communication between storage systems (e.g., 20a and 20n), such as between two of the same or different types of storage systems, and/or can be implemented using a director.

The storage system 20a also can include one or more extended data service adapters 29 (EDSs) which are directors configured to serve as EDSs. An EDS performs various data services, for example, including such services or processing in connection with facilitating other processing performed by BEs and FAs. For example, an EDS can perform processing that manages metadata tables of information used by other directors such as BEs in connection with I/O operations, data deduplication, and the like.

Storage system 20a also can include a management module 22, which is configured (e.g., dedicated) to perform storage management functions or services such as, for example, storage provisioning, device configuration, tier management, other services, or any combination of other services. The management module 22 also can be configured to perform, or assist in performing analysis such as, for example, performance and/or utilization analysis and/or forecasting of system behavior, the result of which inform other management functions performed by the management module 22. The management module 22 can be configured to be accessed by only certain personnel (e.g., storage administrators, support engineers) and can have its own dedicated hardware, firmware, software, CPU resources and OS, and can be loaded with one or more applications, tools, CLIs, APIs and the like to enable management. In some embodiments, the management module, or portions thereof, are located external to storage system 20a, for example, as part of one of host systems 14a-n, as an independent management server, or as part of another separate system connected to storage system 20a via network 18. In some embodiments, the management and analysis functions described herein can be performed using both resource of the management module 22 of the storage system 20a and one management resources located externally to the storage system, for example, on a host system, management server and/or other components.

The FAs, BEs, EDSs and RA can be collectively referred to herein as directors 37a-n. Each director 37a-n can be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing I/O operations, and that as described in more detail elsewhere herein. There can be any number of directors 37a-n, which can be limited based on any of a number of factors, including spatial, computation and storage limitations. In an embodiment disclosed herein, there can be up to sixteen directors coupled to the memory 26. Other embodiments can use a higher or lower maximum number of directors.

System 20a also can include an internal switching fabric (i.e., internal fabric) 30, which includes one or more switches, that enables internal communications between components of the storage system 20a, for example, directors 37a-n (FAs 21a-n, BEs 23a-n, EDSs 29, RA 40, management module 22) and memory 26, e.g., to perform I/O operations. One or more internal logical communication paths can exist between the directors and the memory 26, for example, over the internal fabric 30. For example, any of the directors 37a-n can use the internal fabric 30 to communicate with other directors to access any of physical storage devices 24; i.e., without having to use memory 26. In addition, one of the directors 37a-n can broadcast a message to all of the other directors 37a-n over the internal fabric 30 at the same time. Each of the components of system 20a can be configured to communicate over internal fabric 30 in accordance with one or more technologies such as, for example, InfiniBand (TB), Ethernet, Gen-Z, another technology, or any suitable combination of the foregoing.

The GM portion 25b can be used to facilitate data transfers and other communications between the directors 37a-n in a storage system. In one embodiment, the directors 37a-n (e.g., serving as FAs, EDSs or BEs) can perform data operations using a cache 28 that can be included in the GM 25b, for example, in communications with other directors, and other components of the system 20a. The other portion 25a is that portion of memory used in connection with other designations that can vary in accordance with each embodiment. Global memory 25b and cache 28 are described in more detail elsewhere herein. It should be appreciated that, although memory 26 is illustrated in FIG. 1 as being a single, discrete component of storage system 20a, the disclosed subject matter is not so limited. In some embodiments, memory 26, or the GM 25b or other memory 25a thereof, can be distributed among a plurality of physically discrete processing nodes (e.g., circuit boards) as described in more detail elsewhere herein.

In at least one embodiment, write data received at the storage system from a host or other client can be initially written to cache 28 and marked as write pending. For example, cache 28 can be partitioned into one or more portions called cache slots (which also sometimes referred to in the field of data storage as cache lines, cache blocks or another name), where each of the cache slots can be a predefined uniform size, for example, 128 Kbytes. Write data of a write operation received at the storage system can be initially written (i.e., staged) in one or more of these cache slots and marked as write pending. Once written to cache 28, the host (e.g., one of 14a-n) can be notified that the write operation has completed. At a later time, the write data can be de-staged from cache 28 to one or more physical storage devices 24a-n, such as by a BE.

The memory 26 can include persistent memory for which data stored thereon persists after the process or program that created the data terminates. For example, at least portions of the memory 26 can be implemented using DIMM (or another type of fast RAM memory) that is battery-backed by a NAND-type memory (e.g., flash). In some embodiments, the data in such persistent memory persists (for at least some period of time) after the storage system fails. The memory 26 (or at least a portion thereof—e.g., the cache 28 or a portion thereof) can be configured such that each data written to the memory 28 is mirrored to provide a form of write protection. For example, each memory location within each such mirrored portion of the memory 26 can have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 is distributed among multiple physically discrete processing nodes (e.g., circuit boards), in which case mirroring can configured such that a mirrored memory location and its corresponding redundant memory location are located on different physically discrete processing nodes.

In some embodiments, the storage system 20a includes a back-up power supply 41 (e.g., a battery) that can provide power to the storage system for a limited amount of time to after primary (AC) power fails. This limited time allows certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) can be configured to automatically copy the contents of the memory 26 during this window of time to one or more predetermined physical storage devices, to be restored to the memory 26 after the power has been restored, e.g., as part of the storage system recovering process. Such automatic copying for restoration during recovering is sometimes referred to herein as "vaulting." Vaulting provides a form of write protection for data written to the memory 26, for example, for dirty data in the cache 28; i.e., data written to the storage system, which has been staged in the cache 28 but not yet de-staged to a physical storage device. More broadly, vaulting can be performed for any data written to the memory 26.

The storage system 20a can include a memory management module 32 configured to manage one or more aspects of the memory 26, and the memory management module 32 can include a cache management module 34 for managing one or more aspects of the cache 28.

It should be noted that, although examples of techniques herein are described with respect to a physical storage system and its physical components (e.g., physical hardware for each RA, EDS, BE, FA and the like), the techniques herein can be performed in a physical storage system including one or more emulated or virtualized components (e.g., emulated or virtualized ports, emulated or virtualized EDSs, BEs or FAs), and also a virtualized or emulated storage system including virtualized or emulated components. For example, in embodiments in which NVMe technology is used to communicate with, and transfer data between, a host system and one or more FAs, one or more of the FAs can be implemented using NVMe technology as an emulation of an FC adapter.

Any of storage systems 20a-n, or one or more components thereof, described in relation to FIG. 1 can be implemented using one or more data storage systems such as data storage arrays.

Host systems 14a-n provide data and control (e.g., management and access control) information to the storage systems 20a-n over a plurality of I/O paths defined between the host systems and storage systems, for example, including host system components, storage system components, and network components (e.g., of network 18), and the storage systems also can provide data to the host systems across the I/O paths. In the embodiment of FIG. 1, the host systems do not address the physical storage devices (e.g., disk drives or flash drives) 24 of the storage systems directly, but rather access to data is provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a data storage system can be configured to organize available storage resources (e.g., physical storage devices) into many LUNs, each with its own addressable space defined in logical blocks addresses (LBAs). The LSUs can sometimes correspond to the actual physical storage devices and can also sometimes not correspond to the actual physical storage devices. For example, one or more LSUs can map to a single physical storage device; that is, the logical address space of the one or more LSU can map to physical space on a single physical storage device. Data in a single storage system can be accessed by multiple hosts allowing the hosts to share the data residing therein. The FAs can be used in connection with communications between a storage system and a host system. The RAs can be used in facilitating communications between two storage systems. The BEs can be used in connection with facilitating communications to the associated physical storage device(s) based on LSU(s) mapped thereto.

Figure 2:
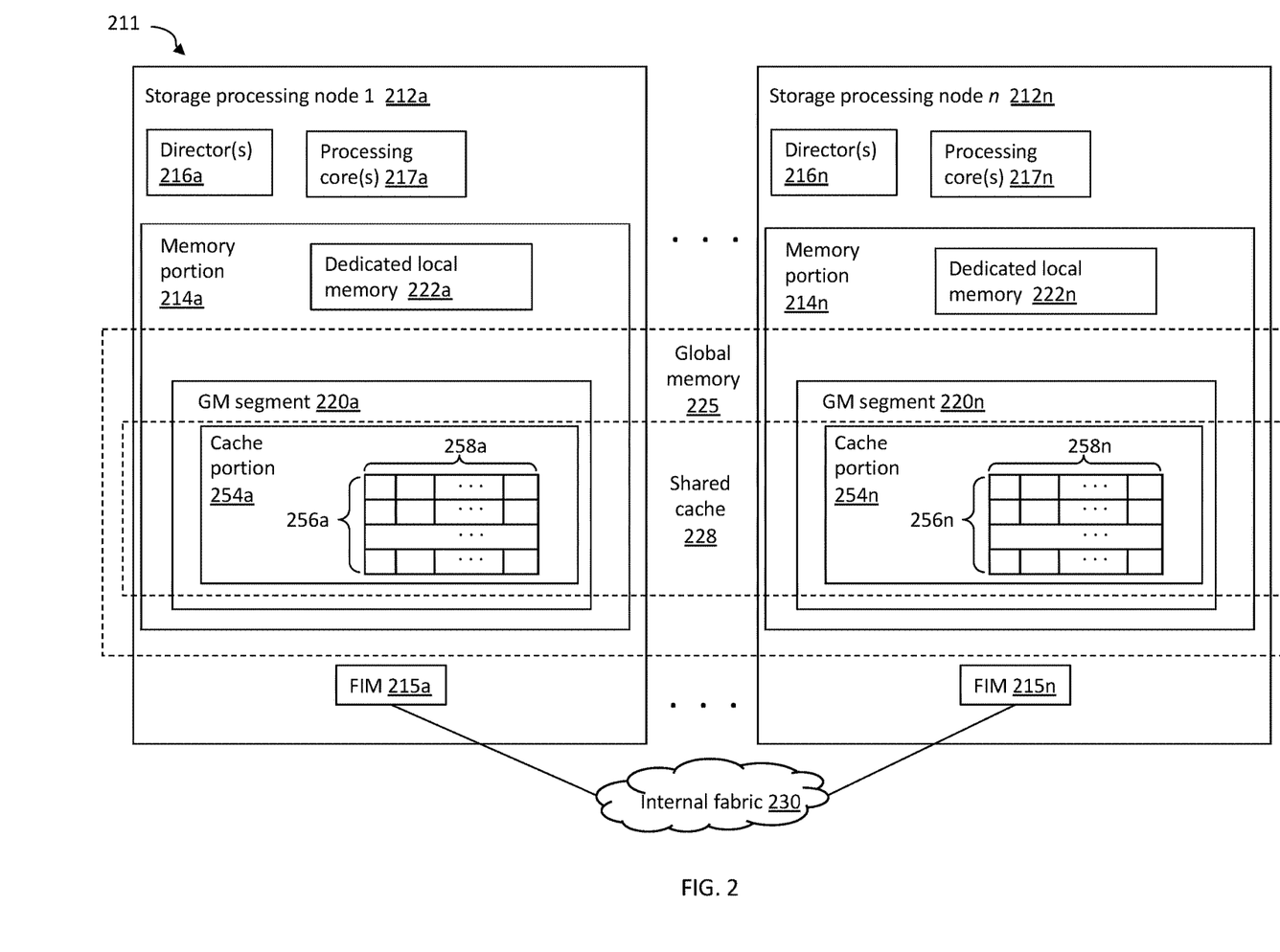
FIG. 2 is a block diagram illustrating a storage system including multiple physically discrete storage processing nodes, according to embodiments of the present disclosure.

FIG. 2 is a block diagram illustrating an example of at least a portion 211 of a storage system (e.g., 20a) including multiple, physically discrete storage processing nodes (e.g., circuit boards) 212a-212n, which are sometimes referred to herein as "processing nodes." The storage system 211 can include a plurality of processing nodes 212a-212n and a fabric 230 (e.g., internal fabric 30) over which the processing nodes 212a-n can communicate. Each of the processing nodes 212a-212n can include components thereon as illustrated. The switching fabric 230 can include, for example, one or more switches and connections between the switch(es) and processing nodes 212a-212n. In at least one embodiment, the fabric 230 is an IB fabric. In some embodiments, multiple processing 212a-n nodes are implemented on a single physically discrete component; e.g., two processing nodes 212a-n can be implemented on single engine of a data storage system.

In the following paragraphs, further details are described with reference to the processing node 212a but each of the N processing nodes in a system can be similarly configured. For example, the processing node 212a can include any of: one or more directors 216a (e.g., directors 37a-n); memory portion 214a; one or more processing cores 217a including compute resources, for example, as part of a CPUs and/or a CPU complex for processing I/O operations; and a fabric interface module (FIM) 215a for interfacing the processing node 212a to an internal fabric 230. Each director 216a can be configured to operate, such as by executing code, as any one or more of an FA, BE, R, EDS and the like. In some embodiments, each of the directors, or a portion thereof, are implemented in software stored in a memory portion 214a (e.g., in a dedicated local memory 222a) that is executed by one or more of the processing cores 217a. Such software implementation of directors can be considered emulations of types of physical directors (i.e., directors implemented (at least primarily) in hardware).

Each FIM 215a-n can include one or more host channel adapters (HCAs) that physically couple, and are configured to enable communication between, its respective processing node 212a-n, and the internal fabric 230. In some embodiments, the internal fabric 230 includes multiple (e.g., 2) switches, and each HCA can have multiple (e.g., 2) ports, each one connected directly to one of the switches.

Each of the processing nodes 212a-n can, respectively, also include memory portions 214a-n. The memory portion of each processing node can be characterized as locally accessible with respect to that particular processing node, and more specifically with respect to other components on the same processing node. For example, processing node 212a includes memory portion 214a which is memory that is local to that particular processing node 212a. Data stored in memory portion 214a can be directly accessed by any of the processing cores 217a (e.g., executing instructions on behalf of one of the directors 216a) of the processing node 212a. For example, memory portion 214a can be a fast memory (e.g., DIMM (dual inline memory module) DRAM (dynamic random access memory)) that is locally accessible by a director 216a, where data from one location in 214a can be copied to another location in 214a directly using DMA operations (e.g., local memory copy operations) issued by director 216a. Thus, the director 216a can directly access data of 214a locally without communicating over the fabric 230.

The memory portions 214a-214n of processing nodes 212a-n can be further partitioned into different portions or segments for different uses. For example, each of the memory portions 214a-214n can respectively include GM segments 220a-n configured for collective use as segments of a distributed GM, for example, GM 225 (e.g., GM 25b). Thus, data stored in any GM segment 220a-n can be accessed by any director 216a-n on any processing node 212a-n. Additionally, each of the memory portions 214a-n can respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a can accessed by the respective single director 216a located on the same processing node 212a. However, the remaining directors located on other ones of the N processing nodes can not access data stored in the dedicated local memory 222a.

To further illustrate, GM segment 220a can include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n can communicate over the fabric 230 to access data in GM segment 220a. In a similar manner, any director 216a-n of any of the processing nodes 212a-n can generally communicate over fabric 230 to access any GM segment 220a-n of the distributed GM. Although a particular GM segment, such as 220a, can be locally accessible to directors on one particular processing node, such as 212a, any director of any of the processing nodes 212a-n can generally access the GM segment 220a. Additionally, the director 216a also can use the fabric 230 for data transfers to and/or from GM segment 220a even though 220a is locally accessible to director 216a (without having to use the fabric 230).

Also, to further illustrate, dedicated local memory 222a can be a segment of the memory portion 214a on processing node 212a configured for local use solely by components on the single/same processing node 212a. For example, dedicated local memory 222a can include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n can include a local page table or page directory used, respectively, by only director(s) 216a-n local to each of the processing nodes 212a-n.

In such an embodiment as in FIG. 2, the GM segments 220a-n can be logically concatenated or viewed in the aggregate as forming one contiguous GM logical address space of a distributed GM. In at least one embodiment, the distributed GM formed by GM segments 220a-n include the cache portion 254a, various metadata and/or structures, and other information, as described in more detail elsewhere herein. Consistent with discussion herein, the cache portion 254a, having cache slots allocated from GM segments 220a-n, can be used to store I/O data (e.g., for servicing read and write operations).

Each cache portion 254a-n can be a portion of a shared cache 228 (e.g., cache 28) distributed across the processing nodes 212a-n, where the shared cache 228 is considered a part of the GM 225. The cache portion 254a-n can include a plurality of cache slots 256a-n, each cache slot including one or more (e.g., 16) sections 258a-n. Each cache slot 256a-n can be of a uniform size (e.g., 128 KB) and each section can be of a uniform size (e.g., 8 KB). It should be appreciated that cache slot sizes and section sizes other than 128 KB and 8 KB, and a quantity of sections other than 16, can be used.

In an embodiment, the storage system as described can be characterized as having one or more logical mapping layers in which an LSU of the storage system is exposed to the host whereby the LSU is mapped by such mapping layers of the storage system to one or more physical storage devices. Additionally, the host also can have one or more additional mapping layers so that, for example, a host-side LSU can be mapped to one or more storage system LSUs as presented to the host.

Any suitable data structures can be used to process I/O on storage system 20a, including data structures to manage the mapping of LSUs and locations thereon to physical storage devices and locations thereon. Such data structures can be stored in any of memory 26, including GM 25b and memory 25a, GM segment 220a-n and/or dedicated local memories 22a-n. Thus, storage system 20a, and storage system 620a described in more detail elsewhere herein, can include memory elements (e.g., cache) that hold data stored on physical storage devices or that is currently held ("staged") and will be stored ("de-staged") to physical storage devices, and memory elements that store metadata (e.g., any of the metadata described herein) associated with such data.

Figure 3:
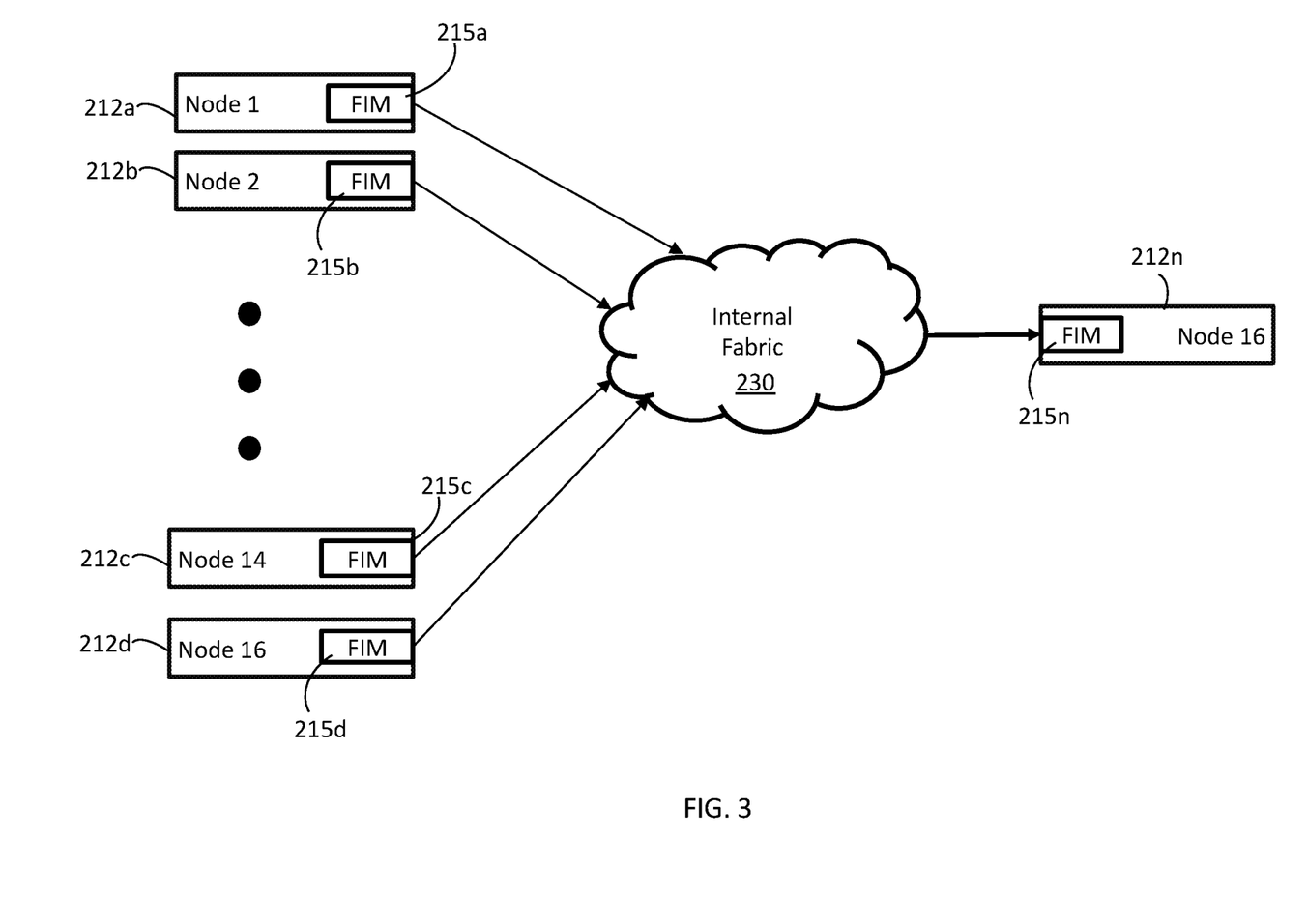
FIG. 3 is a block diagram illustrating multiple physically discrete storage processing nodes sending communications to a same physically discrete storage processing node, according to embodiments of the present disclosure.

As described above, a storage system can include multiple processing nodes. On such a storage system, fan-in congestion can occur when multiple processing nodes send communications to a same processing node, which congestion can be exacerbated and lead to starvation of lower-priority operations. FIG. 3 is a block diagram illustrating fan-in congestion on the portion 211 of a storage system (e.g., the storage system 20a). Multiple processing nodes 212a-d are sending communications (e.g., high-priority communications) via FIMs 215a-d, respectively, over internal fabric 230 to a same processing node 212n, e.g., via FIM 215n of the processing node 212n.

Figure 4:
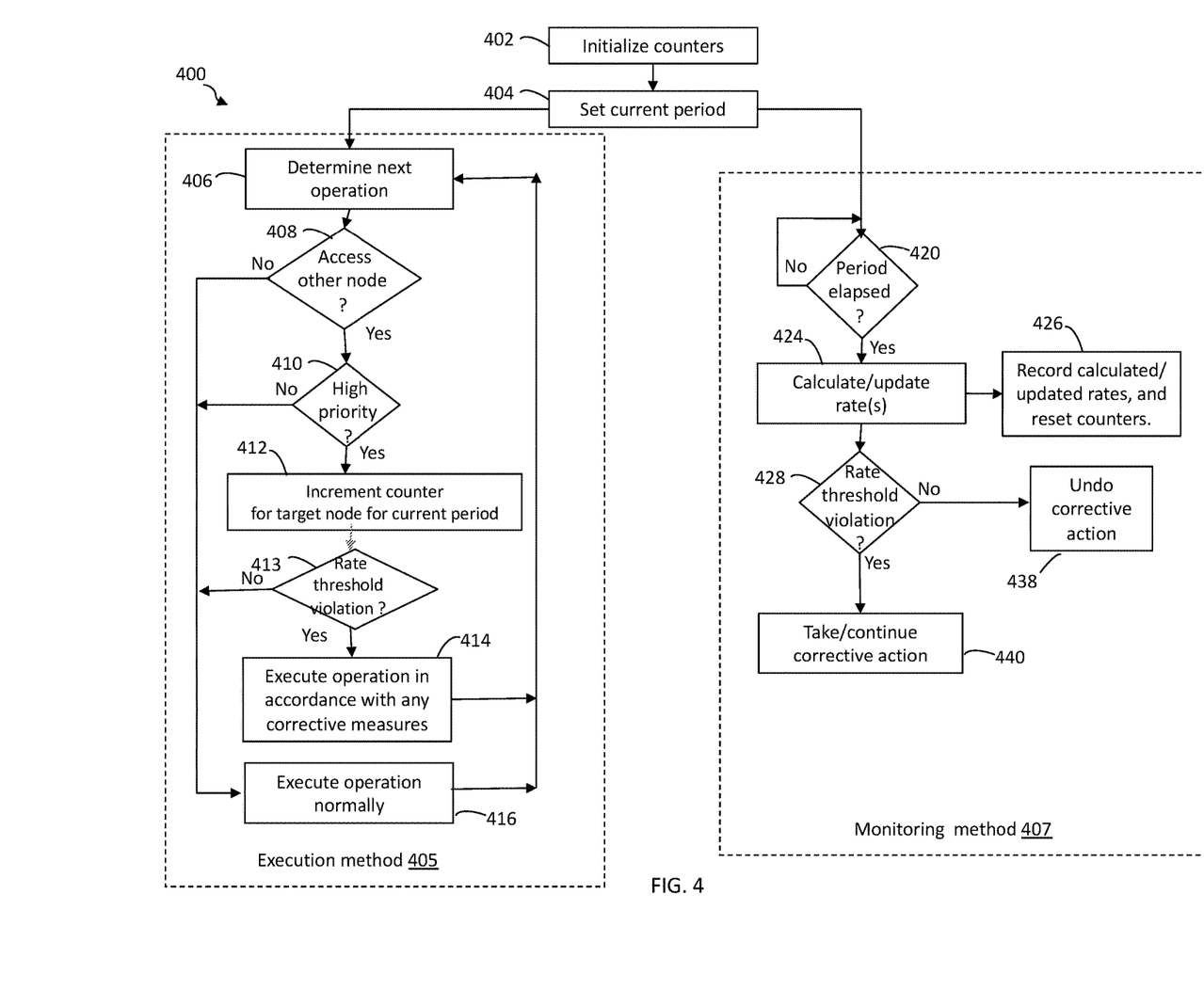
FIG. 4 is a flowchart illustrating a method of managing high-priority operations executed using multiple processing nodes of a storage system, according to embodiments of the present disclosure.

In some embodiments of the disclosed subject matter, the likelihood of the occurrence of starvation of lower-priority operations on storage systems having multiple processing nodes can be reduced, for example, by performance of a method 400 described in connection with FIG. 4. FIG. 4 is a flowchart illustrating the method 400 of managing high-priority operations executed using multiple processing nodes on a storage system, according to at least one embodiment of the disclosed subject matter. Other embodiments of a method of managing high-priority operations between processing nodes on a storage system, for example, variations of the method 400, are possible, and are intended to fall within the scope of the present disclosure. The method 400 can be implemented by any of the directors 37a-n, for example, EDS adapter 29, and/or management module 22, or another component or logic residing on the storage system 20a or external thereto. The logic for implementing the method 400 can reside on each processing node of a storage system, and can be executed on each processing node independently of the other processing nodes.

While aspects of the method 400 are described in relation to a single process (the source process) executing on a processing node (the source node), the method 400 can be performed for each process executing on a processing node.

In a step 402, for each source process on the source node (e.g., 212a), counters are initialized (e.g., set to 0) for each other processing node (target node) on the storage system. For each source process, each counter counts the number of high-priority operations that are initiated by the source process during a period of time that require accessing resources on a respective target node (e.g., 212n). In a step 404, a current period is set. For example, a timer corresponding to a specific time (e.g., in microseconds or milliseconds) corresponding to the beginning of the current period can be initialized to zero and start incrementing.

Following the step 404, an execution method 405 and a monitoring method 407 can be performed concurrently. In at least one embodiment, the execution method 405 can be performed by a process executing on a processing node as part of executing operations, and the monitoring method 407 can be performed by one or more other processes executing on the processing node independently of performing the monitoring method 405. To further illustrate, in at least one embodiment, a first set of processes on the processing node can perform processing for high and/or low priority transactions. Prior to any process of the first set executing or servicing any such transaction, the execution method 405 is performed where, as a result of executing the method 405 discussed in more detail below, processing for the transaction is either executed normally (e.g., in the step 416 of FIG. 4) or alternatively in accordance with one or more corrective measures (e.g., in the step 414). Additionally, one or more other processes also executing on the same processing node can perform the processing of the monitoring method 407.

Generally, as discussed below, the monitoring method 407 calculates updated rates for each elapsed time period, determines whether any of one or more specified rate thresholds have been violated, and then can take one or more corrective actions or measures for any detected rate violations. The execution method 405 increments a counter for a particular source process executing a source node for each high-priority operation initiated by the source process, where the high-priority operation requires access to a particular target node. Additionally, the execution method 405 determines whether any of one or more specified rate thresholds for the particular source process and particular target node have been violated, and then can take one or more corrective actions or measures for any detected rate violations. The monitoring method 407 calculates rates used by both the execution method 405 and also the monitoring method 407 when determining whether there is a rate violation. In at least one embodiment, the monitoring method 407 determines a set of rates for use during a next time period TT+1 by the execution method 405 when the time period TT has elapsed. Information collected, such as counter values, during the time period TT by the execution method 405 can be used by the monitoring method 407 in determining an updated set of rates for use by the execution method 405 during the next time period TT+1. In one embodiment, the set of rates used by the execution method 405 for a time period are based on a most recent set of rates previously determined by the monitoring method 407 for the immediately preceding time period.

Regarding the execution method 405, a source process can determine the next operation for execution in a step 406. For example, in response to an I/O request being received at the source node from a host system (e.g., 14a), the source process, running on an OS of the source node, determines a next operation to perform in connection with processing the I/O request. Such operations are not limited to operations that operate on the data of an I/O request itself, but can include operations that involve metadata corresponding to the I/O request.

At a step 408 (or as part performance of the step 406), processing is performed to determine whether the determined next operation (e.g., as determined in the step 406) includes accessing resources (e.g., memory) of a target node. For example, the determined operation can include retrieving data or metadata from, or storing data or metadata in, global memory (e.g., 220n) on a target node. If it is determined in the step 408 that the operation does not require accessing a target node, then the operation can be executed normally in the step 416. That is, the operation is executed without consideration of any steps or corrective measures specific to high-priority operations requiring access to resources on another processing node.

If it is determined in the step 408 that the operation does require accessing a target node, then control proceeds to a step 410. At the step 410, processing is performed to determine whether the next operation is a high-priority operation (which can be ascertained as part of performing the step 406). If the operation is not a high-priority operation, the method 400 proceeds to the step 416.

If the operation is a high-priority operation, then a counter for the target node for the current period is incremented in a step 412. The counter counts the number of operations initiated by the source process during the current period that require access to the target node. As described in more detail elsewhere herein, the final counter value at the end of a period can be used to calculate one or more rates at which the source process itself and/or a plurality of processes on the source node cumulatively initiate high-priority operations that require accessing the target node. The incremented counter value can be stored in one or more data structures, as described in more detail herein such as, for example, in connection with FIG. 5. From the step 412, control proceeds to a step 413.

At the step 413, a determination is made as to whether there is a rate violation for the current period for the source process running on the source node with respect to operations that require access to the target node. The step 413 can generally use one or more individual rates that are particular to the source process. The one or more rates used in the step 413 are determined in the step 424 of the monitoring process 407 discussed below. In at least one embodiment, the step 413 can use one or more of the following two rates in determining whether there is a rate violation with respect to the source process during the current period for high-priority operations that require access to the target node: 1) a rate of high-priority operations initiated by the source process during the current period that require accessing the target node (i.e., the present individual rate," "PIR") for the current period; 2) an average rate of high-priority operations initiated by the source process over a larger period of time (e.g., since the method 400 was initiated) that require accessing the target node (i.e., the "average individual rate," "AIR"). PIRs and AIRs and how they can be calculated in an embodiment are described in more detail below in connection with the step 424. Additionally, calculated rates for PIRs, AIRs and other metrics can be stored in tables or structures as discussed below in connection with FIG. 5. In at least one embodiment, the values for PIRs and AIRs for the current period can be read from the tables or structures as described in connection with FIG. 5 since the monitoring method 407 would have completed calculating and storing the PIRs and AIRs for the current period.

The rate violation determination processing of the step 413 can generally use one or more rate thresholds and one or more corresponding rates. For example, a PIR threshold (PIRth) and an AIR threshold (AIRth) can be predefined for the PIR and AIR, respectively. The step 413 can include comparing each of PIR to PIRth, and also comparing AIR to AIRth. For each comparison, a threshold violation occurs if the rate in question reaches or exceeds its corresponding respective threshold.

If the step 413 evaluates to yes or true, whereby a rate violation is determined for the current period for the source process running on the source node with respect to operations that require access to the target node, then control proceeds to the step 414. Otherwise, if the step 413 evaluates to no or false, whereby no rate violation is determined for the current period for the source process running on the source node with respect to operations that require access to the target node, control proceeds from the step 413 to the step 416.

At the step 414, the operation is executed in accordance with any corrective measures currently in place for high-priority operations requiring access to resources on another processing node. Such corrective measures can include, for example, reducing the extent of precedence given to high-priority operations, which can include reducing execution time objectives for such high-priority operations. For example, a high-priority operation may not be queued for execution ahead of as many previously queued, lower-priority operations as it otherwise would be without the corrective measures, or may not be queued ahead of previously queued, lower-priority operations at all. With normal processing in at least one embodiment without the corrective measure or action, the high-priority operation may be queued for service and processed prior to all other queued or lower-priority operations awaiting servicing. In such an embodiment, the corrective measure can indicate not to reorder the service queue and not to place the high-priority operation in the queue for servicing ahead of any other lower priority operation already in the queue. Effectively, the corrective measure can temporarily reduce the servicing priority order of the high-priority operation in order to allow any other currently pending lower priority operation(s) to be serviced prior to the high-priority operation.

In at least one embodiment, the corrective action or measure can include not allowing high-priority operations to take precedence over other non-high-priority operations. The corrective action can be enforced or implemented for a specified amount of time.

In at least one embodiment, the corrective action or measure can include only allowing a high-priority operation to take precedence over a specified number of other non-high-priority operations awaiting servicing in a queue. In this manner, the specified number of other non-high-priority operations are allowed to proceed for servicing prior to the high priority operation.

In at least one embodiment, the steps 412 and 414 are performed concurrently. Alternatively in at least one embodiment, the step 412 can be performed after the step 414.

After the performance of the step 414 or the step 416, the method 405 returns to the step 406. It should be appreciated that the step 406 or a portion thereof can be performed to determine one or more next operations while the steps 408-414 are being performed for one or more operations that have already been determined.

The monitoring method 407 includes a step 420 of determining whether the current period (e.g., on the order of hundreds of microseconds or of milliseconds) has elapsed, for example, whether a timer for the period has elapsed.

If it is determined in the step 420 that the current period has elapsed, the steps 424-440 are performed. In a step 424, one or more rates are calculated (e.g., updated) corresponding to a present or current period. Generally, in the step 424, the Monitoring method 407 calculates and stores various types of rates, which are used by both the Execution method 405 and the Monitoring method 407 when determining whether there is a rate violation/rate threshold violation (e.g., in the steps 413 and 428), and where responsive to determining that there is a rate violation/rate threshold violation, one or more corrective actions or measures are performed.

It should be appreciated that, in the context of the step 420, the present period is the period for which the one or more rates are being calculated, e.g., the period that was determined to have elapsed in the step 420, which triggered the performance of the steps 424-440. Thus, in some embodiments, while operations for a current period are being processed by the execution method 405, the steps 424-440 of the monitoring method 407 are being performed for the immediately preceding period as the present period.

The one or more rates calculated in the step 424 can include, but are not limited to: 1) a rate of high-priority operations initiated by the first process during the present period that require accessing the target node (i.e., the present individual rate," "PIR" as noted above in connection with the step 413); 2) an average rate of high-priority operations initiated by the first process over a larger period of time (e.g., since the method 400 was initiated), which includes the present period, that require accessing the target node (i.e., the "average individual rate," "AIR" as noted above in connection with the step 413); 3) a rate of high-priority operations initiated by the plurality of processes on the source node during the present period that require accessing the target node (i.e., "present cumulative rate," "PCR"); and 4) an average rate of high-priority operations initiated by the plurality of processes on the source node over the larger period of time that require accessing the target node (i.e., "average cumulative rate," "ACR").

For each process running on a processing node, the PIR for each target node can be determined by dividing the counter value for the present period, C, for the target node by the predefined length of time, T, of a period, i.e., PIR=C/T. For example, if C=20 and T=1 ms, then PIR=20/ms.

For each process running on a processing node, the AIR for each target node can be determined using any of a variety of average calculations, for example, a type of moving average. In some embodiments, an exponential moving average (EMA) can be determined for a series of periods, including the present period, for example, for periods that have elapsed since the initiation of the method 400. In some embodiments, e.g., in which EMA is employed, for the initial period (t=1) for which counts were recorded and a PIR calculated (e.g., per method 400), the AIR for a target node can be set equal to the PIR for the target node for the initial period. That is, for t=1, AIR=PIR. In such embodiments, for all periods after the initial period (t>1), the PIR for each target node can be calculated by application of Equation 1, or a variation thereof.

$$AIR = \alpha * PIR_t + (1-\alpha) AIR_{t-1} \quad \text{Equation 1}$$

where:
- $\alpha$ is a smoothing coefficient having a value between 0 and 1, which represents a degree of weighting decrease; i.e., a constant smoothing factor. A higher value of $\alpha$ discounts older PIRs faster.
- $PIR_t$ is the PIR calculated for the present period t.
- $AIR_{t-1}$ is a value of AIR calculated for an immediately preceeding period t−1.
- $AIR_t$ is the value of AIR calculated for present period t.

Any of a variety of variations of Equation 1 can be used in an embodiment.

The PCR for a target node can be determined by summing the PIRs for the target node of all the processes running on the processing node, or by summing the counter values for the present period, C, for the target node of all of the processes and dividing the result by the predefined length of time, T, of a period.

The ACR for a target node can be determined using any of a variety of average calculations, for example, a type of moving average. In some embodiments, an exponential moving average (EMA) can be determined for a series of periods, including the present period, for example, for periods that have elapsed since the initiation of the method 400. In some embodiments, e.g., in which EMA is employed, for the initial period (t=1) for which counts were recorded and a PCR calculated (e.g., per method 400), the ACR for a target node can be set equal to the PCR of the initial period. That is, for t=1, ACR=PCR. In such embodiments, for all periods after the initial period (t>1), the ACR can be calculated by application of Equation 2, or a variation thereof.

$$ACR = b * PCR_t + (1-b) ACR_{t-1} \quad \text{Equation 2}$$

where:
- b is a smoothing coefficient having a value between 0 and 1, which represents a degree of weighting decrease; i.e., a constant smoothing factor. A higher value of b discounts older CIRs faster. In at least one embodiment, b=a.
- $PCR_t$ is the PCR calculated for the present period t.
- $ACR_{t-1}$ is a value of ACR calculated for immediately preceeding period t−1.
- $ACR_t$ is the value of ACR calculated for present period t.

Any of a variety of variations of Equation 2 can be used in an embodiment.

From the step 424, control proceeds to the step 426. At the step 426, the calculated rates can be recorded in one or more data structures, for example, the data structures 500 and 550 described in relation to FIG. 5 discussed below. Additionally, the step 426 includes resetting one or more counters. For example, for each of one or more processes running on the processing node, the counters for each target node are reset. In some embodiments, the same periods of time are used for all processes such that all counters for all processes on the processing node can be reset as part of performing the step 426. The step 426 can also include resetting the timer for the period to denote another/next period has commenced.

Figure 5:
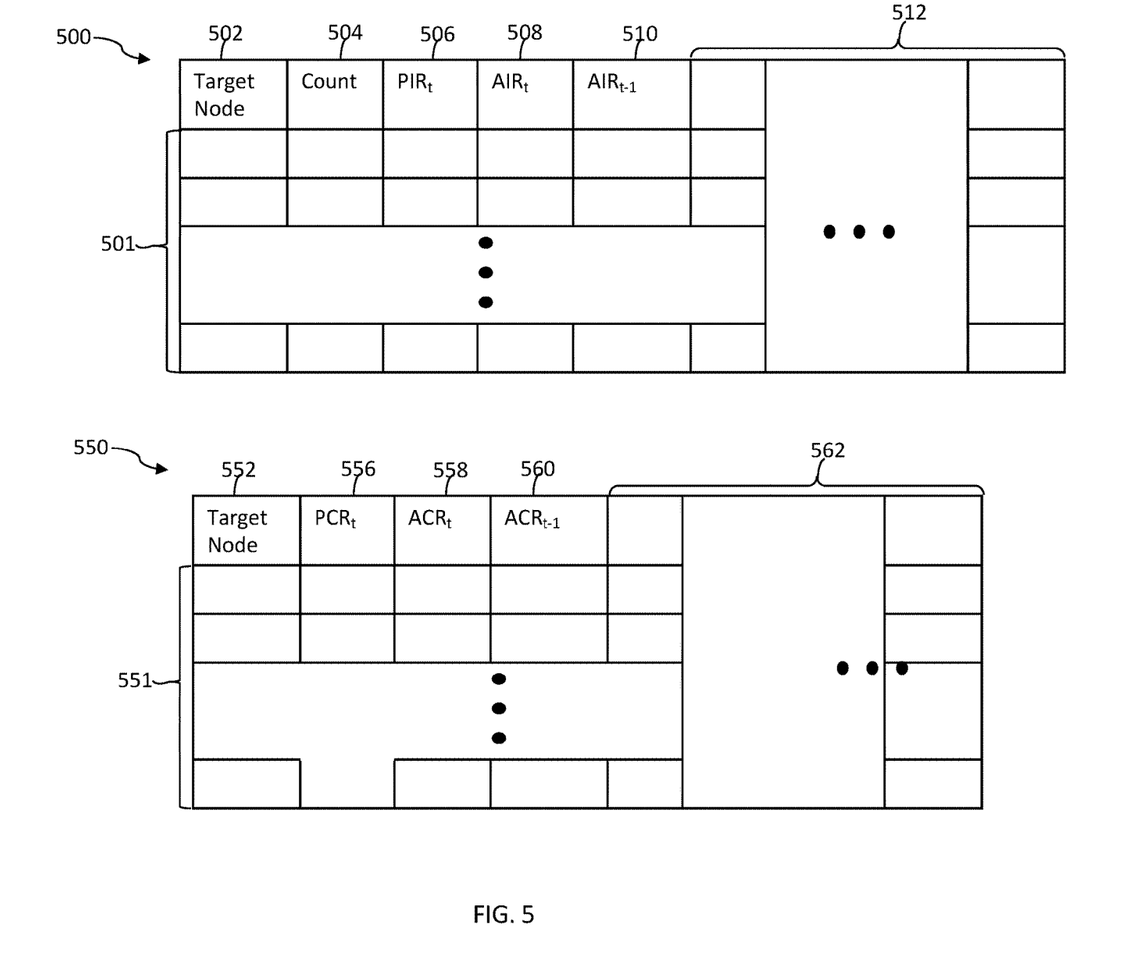
FIG. 5 illustrates data structures for recording rates of initiating high-priority operations on a processing node that require accessing other processing nodes on a storage system, according to embodiments of the present disclosure.

FIG. 5 illustrates the data structures 500 and 550 for recording rates of initiating high-priority operations on a processing node that require accessing other processing nodes on a storage system, according to embodiments of the disclosed subject matter. Other embodiments of data structures for recording rates of initiating high-priority operations on a processing node that require accessing other processing nodes on a storage system, for example, variations of the data structures 500 and 550, are possible, and are intended to fall within the scope of the present disclosure.

In at least one embodiment, the data structure 500 stores rate information for an individual process, and is also referred to herein as the "individual rate table" (IRT). The IRT 500 includes a plurality of entries 501, where each entry represents a target node. Each entry can include one or more of the following information elements: a target node ID of the target node represented by the entry in a column 502; the counter value for the target node for the present period; the $PIR_t$ for the target node in a column 506; the $AIR_t$ for the target node in a column 508, the $AIR_{t-1}$ for the target node in a column 510, and historical rate information in one or more columns 512, including, for example, the AIRs, PIRs and counts for the target node for other earlier periods. The count values in the column 504 and columns of historical information columns 512 storing historical counter values can be populated by execution of the step 412. The values in the columns 506, 508, 510 and columns of historical information columns 512 storing corresponding historical values can be populated by execution of the step 426.

The data structure 550 can store cumulative rate information for a plurality of processes executing on a processing node, and is also referred to herein as the "cumulative rate table" (CRT). The CRT 550 can include a plurality of entries 551, where each entry represents a target node. Each entry can include one or more of the following information elements: a target node ID of the target node represented by the entry in a column 552; the $PCR_t$ for the target node in a column 556; the $ACR_t$ for the target node in a column 558, the $ACR_{t-1}$ for the target node in a column 560, and historical rate information in one or more columns 562, including for example, the ACRs and PCRs for the target node for other earlier periods. The values in the columns 556, 558, 560 and columns of historical information columns 562 storing corresponding historical values can be populated by execution of the step 426.

It should be appreciated that information included in the IRT 500 and the CRT 550 can be combined in one or more other data structures and that one or more other data structures (e.g., including indexes of information) can be derived from the IRT 500 and/or the CRT 550. Data structures other than tables can be used, including, for example, object-oriented data structures, linked-lists, trees and/or flat files.

Returning to the monitoring method 407 of the method 400, before, after or concurrently to the performance of the step 426, the steps 428-440 can be performed. In a step 428, it is determined, for each determined rate, whether a rate threshold has been violated. For example, a PIR threshold ($PIR_th$), an AIR threshold ($AIR_th$), a PCR threshold ($PCR_th$) and an ACR threshold ($ACR_th$) can be predefined for the PIR, AIR, PCR and ACR, respectively. The step 428 can include comparing each of PIR, AIR, PCR and ACR to $PIR_th$, $AIR_th$, $PCR_th$ and $ACR_th$, respectively. For each comparison, a threshold violation occurs if the rate in question reaches or exceeds its respective threshold.

For each of PIR, AIR, PCR and ACR, if it is determined in the step 428 that the rate meets or exceeds its respective threshold, then one or more correction actions or measures can be taken or continued in the step 440. The steps 428 and 440 can be performed independently for each rate, serially or concurrently. Corrective actions taken in the step 440 can be similar to those described in connection with the step 414.

Any of a variety of corrective actions can be taken in the steps 440 and also the step 414, for example, reducing or removing precedence given to high-priority operation over lower-priority operations. For example, the extent of precedence given to high-priority operations for a violating process or multiple processes can be reduced, which can include reducing execution time objectives for such operations. For example, a high-priority operation may not be queued for execution ahead of as many previously queued, lower-priority operations as it otherwise would be without the corrective actions being taken, or may not be queued ahead of previously queued, lower-priority operations at all.

Corrective action taken in the steps 414 and 440 can depend on which rate threshold has been violated. For example, if the step 431 or 428 determines that one of the individual process thresholds, $PIR_th$ or $AIR_th$, are reached or exceeded, the corrective action taken respectively in the steps 414 or 440 can be directed to the individual process that violated the threshold. Alternatively, if the step 428 determines that one of the cumulative thresholds, $PCR_th$ or $ACR_th$, are reached or exceeded, the corrective action taken in the step 440 can be directed to multiple (e.g., all) processes of the processing node. Also, if one of the present period thresholds, $PIR_th$ or $PCR_th$, are reached or exceeded, the corrective action taken can be more immediate and aggressive than if one of the average thresholds, $AIR_th$ or $ACR_th$, are reached or exceeded.

For each of PIR, AIR, PCR and ACR, if it is determined in the step 428 that the rate does not meet or exceed its respective threshold, then a previous corrective action currently being implemented or enforced, if any, can be undone in a step 438. For example, the processes affected by previous corrective actions in effect can be returned to processing high-priority operations that require accessing resources on a target node as they did before the corrective actions were put in place. In some embodiments, rather than undoing the correction actions, the corrective actions can be mitigated to some degree. For example, assume a corrective action in effect is that a high-priority operation has precedence over all or every queued lower-priority operations awaiting servicing. The step 438 can include reducing the impact of the corrective action but still have a corrective action in effect. For example, the step 438 can include a reduced corrective action in effect where a high-priority operation has precedence over only a specified number "K" of queued lower-priority operations (rather than every queued lower-priority operation) awaiting servicing. Effectively, the reduced corrective action places an upper bound, K, on the number of queued lower-priority operations that a single high-priority operation is allowed to take precedence over for servicing or processing.

In some embodiments, in the step 428, only the average rates, AIR and ACR are compared to their respective average rate thresholds, $AIR_th$, and $ACR_th$, in particular, if EMAs are used. It can be desirable to use only the average thresholds to avoid prematurely taking corrective action for a short-lived spike in high-priority operations that require accessing resources on a target node. Further, if an EMA is used, the smoothing factor can allow (depending on the predefined value of smoothing coefficient) for a slower, smoother transition to a higher average rate as a result of recent increases in count values than if an unweighted average were used. Similarly, if enough recent count values have been high enough to cause a correcting action to be taken, then using only averages, and in particular EMAs, can avoid prematurely undoing corrective action for a short-lived reduction in high-priority operations that require accessing resources on a target node.

When present rates PIR and PCR also (or only) are compared to their respective present rate thresholds, $PIR_th$, and $PCR_th$, the threshold values can be set relatively high compared to the average rate thresholds, $AIR_th$, and $ACR_th$ (e.g., can be a multiple thereof). It can be desirable to do so to address the situation where a process is experiencing extremely high counts of high-priority operations that require accessing resources, for which it can be desirable to take more immediate action. For example, if the $AIR_th$ of a process for a target node is set at 25 ms, a $PIR_th$ of the process can be set at 100 ms.

Various embodiments of the disclosed subject matter can be combined with each other in appropriate combinations. Additionally, in some instances, the order of steps in the flowcharts, flow diagrams and/or described flow processing can be modified, where appropriate. It should be appreciated that any of the methods described herein, including method 400, or parts thereof, can be implemented using one or more of the systems and/or data structures described in relation to FIGS. 1-3 and 5 or components thereof. For example, any such methods or portions thereof can be implemented by any of the directors 37a-n, for example, EDS adapter 29, and/or management module 22, or another component or logic residing on the storage system 20a or external thereto. Further, various aspects of the disclosed subject matter can be implemented using software, firmware, hardware, any suitable combination thereof and/or other computer-implemented modules or devices having the described features and performing the described functions. Logic that when executed performs methods described herein, steps thereof or portions of such methods or steps, can be implemented as software, firmware, hardware, or any suitable combination thereof.

Software implementations of embodiments of the disclosed subject matter can include executable code that is stored on one or more computer-readable media and executed by one or more processors. Each of the computer-readable media can be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code can be stored and executed by a processor. Embodiments of the disclosed subject matter can be used in connection with any appropriate operating system.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of an ordinal term, e.g., "first," "second" or the like, to qualify a term for an item having multiple instances of the same name does not necessarily indicate a priority, precedence or temporal order between the instances unless otherwise indicated, but rather such ordinal terms can be used merely to distinguish between the separate instances.

Other embodiments of the disclosed subject matter will be apparent to those skilled in the art from a consideration of the specification or practice of the disclosed subject matter. It is intended that the specification and examples be considered as exemplary only, with the true scope and spirit of the present disclosure being indicated by the following claims.

What is claimed is:

1. A method comprising:
performing an execution process, independently and in parallel to a monitoring process, wherein the execution process includes, for a current period of time:
for a first process executing on a first processing node of a plurality of nodes of a data storage system, determining that a first operation to be executed for the first process of the first processing node requires accessing a second processing node of the plurality of nodes of the data storage system over an internal fabric of the data storage system, wherein the first processing node includes a first memory and the second processing node includes a second memory, wherein the first memory and the second memory are included in a global memory accessible by the plurality of processing nodes over the internal fabric, wherein the first operation for the first process of the first processing node includes accessing the second memory of the second processing node over the internal fabric according to an InfiniBand protocol to perform any of: i) read content from the second memory of the second processing node and ii) write content to the second memory of the second processing node, wherein the first process is included in a plurality of processes that perform operations to access the second memory of the second node;
determining that the first operation is of a first category of operation, wherein the first category of operation is high priority;
updating an average rate at which the first process of the first processing node initiates first category operations that require accessing the second processing node over the internal fabric, wherein the average rate is calculated over the current period of time;
determining whether the updated average rate, for the first process of the first processing node, exceeds an individual average rate threshold for individual processes; and
responsive to determining that the updated average rate for the first process of the first processing node exceeds the individual average rate threshold, taking a first corrective action for the first process of the first processing node, wherein the first corrective action is directed to only the first process of the first processing node and includes not allowing high priority operations of the first process to take precedence over other queued non-high priority operations of the first process awaiting servicing; and
when the current period of time has elapsed, performing processing by the monitoring process including:
determining that a second updated average rate, at which the first process initiates first category operations that require accessing the second processing node over the internal fabric, does not exceed the individual average rate threshold, wherein the second updated average rate is calculated as an exponential moving average over a second period of time including at least a period of time preceding the current period of time; and
responsive to determining that the second updated average rate does not exceed the individual average rate threshold, enforcing a reduced corrective action rather than the first corrective action, wherein the reduced corrective action allows each high priority operation of the first process to have precedence over only a specified number of other queued non-high priority operations of the first process.

2. The method of claim 1, further comprising:
calculating a first rate of first category operations initiated by the first process during a first period of time that require accessing the second processing node over the internal fabric, wherein the first rate is used to update the average rate.

3. The method of claim 2, further comprising:
in response to determining that the first operation to be executed requires accessing the second processing node of the data storage system over the internal fabric and is of the first category, incrementing a first counter that counts first category operations initiated by the first process during a current period that require accessing the second processing node over the internal fabric.

4. The method of claim 2, further comprising:
determining whether the first rate exceeds an individual rate threshold for individual processes; and
if it is determined that the first rate exceeds the individual rate threshold, taking a corrective action for the first process.

5. The method of claim 1, wherein during normal processing, execution of high-priority operations takes precedence over execution of non-high-priority operations.

6. The method of claim 5, wherein the first corrective action is enforced or implemented for a specified amount of time.

7. The method of claim 1, wherein execution of the first operation includes accessing memory on the second processing node.

8. The method of claim 1, wherein than the execution process executes on the first processing node.

9. A system comprising:
one or more processors; and
one or more memories comprising code stored thereon that, when executed, performs a method including:
performing an execution process, independently and in parallel to a monitoring process, wherein the execution process includes, for a current period of time:
for a first process executing on a first processing node of a plurality of nodes of a data storage system, determining that a first operation to be executed for the first process of the first processing node requires accessing a second processing node of the plurality of nodes of the data storage system over an internal fabric of the data storage system, wherein the first processing node includes a first memory and the second processing node includes a second memory, wherein the first memory and the second memory are included in a global memory accessible by the plurality of processing nodes over the internal fabric, wherein the first operation for the first process of the first processing node includes accessing the second memory of the second processing node over the internal fabric according to an InfiniBand protocol to perform any of: i) read content from the second memory of the second processing node and ii) write content to the second memory of the second processing node, wherein the first process is included in a plurality of processes that perform operations to access the second memory of the second node;

determining that the first operation is of a first category of operation, wherein the first category of operation is high priority;

updating an average rate at which the first process of the first processing node initiates first category operations that require accessing the second processing node over the internal fabric, wherein the average rate is calculated over the current period of time;

determining whether the updated average rate, for the first process of the first processing node, exceeds an individual average rate threshold for individual processes; and responsive to determining that the updated average rate for the first process of the first processing node exceeds the individual average rate threshold, taking a first corrective action for the first process of the first processing node, wherein the first corrective action is directed to only the first process of the first processing node and includes not allowing high priority operations of the first process to take precedence over other queued non-high priority operations of the first process awaiting servicing; and when the current period of time has elapsed, performing processing by the monitoring process including:

determining that a second updated average rate, at which the first process initiates first category operations that require accessing the second processing node over the internal fabric, does not exceed the individual average rate threshold, wherein the second updated average rate is calculated as an exponential moving average over a second period of time including at least a period of time preceding the current period of time; and responsive to determining that the second updated average rate does not exceed the individual average rate threshold, enforcing a reduced corrective action rather than the first corrective action, wherein the reduced corrective action allows each high priority operation of the first process to have precedence over only a specified number of other queued non-high priority operations of the first process.

10. The system of claim 9, wherein the method further includes:

calculating a first rate of first category operations initiated by the first process during a first period of time that require accessing the second processing node over the internal fabric, wherein the first rate is used to update the average rate.

11. The system of claim 10, wherein the method further includes:

in response to determining that the first operation to be executed requires accessing the second processing node of the data storage system over the internal fabric and is of the first category, incrementing a first counter that counts first category operations initiated by the first process during a current period that require accessing the second processing node over the internal fabric.

12. One or more non-transitory computer-readable media having code stored thereon, that when executed, performs a method comprising:

performing an execution process, independently and in parallel to a monitoring process, wherein the execution process includes, for a current period of time:

for a first process executing on a first processing node of a plurality of nodes of a data storage system, determining that a first operation to be executed for the first process of the first processing node requires accessing a second processing node of the plurality of nodes of the data storage system over an internal fabric of the data storage system, wherein the first processing node includes a first memory and the second processing node includes a second memory, wherein the first memory and the second memory are included in a global memory accessible by the plurality of processing nodes over the internal fabric, wherein the first operation for the first process of the first processing node includes accessing the second memory of the second processing node over the internal fabric according to an InfiniBand protocol to perform any of: i) read content from the second memory of the second processing node and ii) write content to the second memory of the second processing node, wherein the first process is included in a plurality of processes that perform operations to access the second memory of the second node;

determining that the first operation is of a first category of operation, wherein the first category of operation is high priority;

updating an average rate at which the first process of the first processing node initiates first category operations that require accessing the second processing node over the internal fabric, wherein the average rate is calculated over the current period of time;

determining whether the updated average rate, for the first process of the first processing node, exceeds an individual average rate threshold for individual processes; and responsive to determining that the updated average rate for the first process of the first processing node exceeds the individual average rate threshold, taking a first corrective action for the first process of the first processing node, wherein the first corrective action is directed to only the first process of the first processing node and includes not allowing high priority operations of the first process to take precedence over other queued non-high priority operations of the first process awaiting servicing; and when the current period of time has elapsed, performing processing by the monitoring process including:

determining that a second updated average rate, at which the first process initiates first category operations that require accessing the second processing node over the internal fabric, does not exceed the individual average rate threshold, wherein the second updated average rate is calculated as an exponential moving average over a second period of time including at least a period of time preceding the current period of time; and responsive to determining that the second updated average rate does not exceed the individual average rate threshold, enforcing a reduced corrective action rather than the first corrective action, wherein the reduced corrective action allows each high priority operation of the first process to have precedence over only a specified number of other queued non-high priority operations of the first process.

* * * * *